US007565517B1

(12) United States Patent
Arbon

(10) Patent No.: US 7,565,517 B1
(45) Date of Patent: Jul. 21, 2009

(54) RETARGETING A CAPTURED IMAGE TO NEW HARDWARE WHILE IN A PRE-BOOT ENVIRONMENT

(75) Inventor: Val A. Arbon, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 559 days.

(21) Appl. No.: 10/938,473

(22) Filed: Sep. 9, 2004

Related U.S. Application Data

(63) Continuation-in-part of application No. 10/406,139, filed on Apr. 2, 2003.

(60) Provisional application No. 60/370,100, filed on Apr. 3, 2002.

(51) Int. Cl.
G06F 9/00 (2006.01)
G06F 15/177 (2006.01)
(52) U.S. Cl. .................. 713/1; 713/2; 709/220
(58) Field of Classification Search ............... 713/1, 713/2; 717/172, 175, 176; 714/15; 709/220
See application file for complete search history.

(56) References Cited

U.S. PATENT DOCUMENTS

| 5,325,532 | A | * | 6/1994 | Crosswy et al. ............ 713/2 |
| 5,412,772 | A | | 5/1995 | Monson |
| 5,675,769 | A | | 10/1997 | Ruff et al. |
| 5,706,472 | A | | 1/1998 | Ruff et al. |
| 5,845,295 | A | | 12/1998 | Houseman et al. |
| 5,920,700 | A | | 7/1999 | Gordon et al. |
| 5,930,831 | A | | 7/1999 | Marsh et al. |
| 5,933,647 | A | | 8/1999 | Aronberg et al. |
| 5,987,506 | A | | 11/1999 | Carter et al. |
| 6,067,410 | A | | 5/2000 | Nachenberg |
| 6,080,207 | A | * | 6/2000 | Kroening et al. ............ 717/172 |
| 6,088,778 | A | | 7/2000 | Ruff et al. |
| 6,108,697 | A | | 8/2000 | Raymond et al. |
| 6,108,759 | A | | 8/2000 | Orcutt et al. |
| 6,117,188 | A | | 9/2000 | Aronberg et al. |
| 6,151,624 | A | | 11/2000 | Teare et al. |
| 6,173,291 | B1 | | 1/2001 | Jenevein |
| 6,173,417 | B1 | * | 1/2001 | Merrill ................... 714/15 |
| 6,178,487 | B1 | | 1/2001 | Ruff et al. |
| 6,178,503 | B1 | | 1/2001 | Madden et al. |
| 6,185,575 | B1 | | 2/2001 | Orcutt |
| 6,185,666 | B1 | | 2/2001 | Murray et al. |
| 6,253,300 | B1 | | 6/2001 | Lawrence et al. |

(Continued)

OTHER PUBLICATIONS www.nu2.nu; Bart's Preinstalled Environment (BartPE) bootable live windows CD/DVD; taken from referenced cite Aug. 30, 2004.

(Continued)

*Primary Examiner*—Suresh K Suryawanshi
(74) *Attorney, Agent, or Firm*—AdvantEdge Law Group

(57) ABSTRACT

Methods are provided for retargeting captured images to new hardware. An image taken from a computer having hardware drivers and other system information in one hardware configuration can be modified to adapt it for use on a computer having different hardware requiring different drivers, even when the second hardware configuration was not known at the time of imaging. Systems and configured storage media for retargeting captured images to new hardware are also provided.

52 Claims, 8 Drawing Sheets

U.S. PATENT DOCUMENTS

| | | | |
|---|---|---|---|
| 6,295,538 B1 | 9/2001 | Cooper et al. | |
| 6,317,826 B1 * | 11/2001 | McCall et al. | 713/1 |
| 6,330,653 B1 | 12/2001 | Murray et al. | |
| 6,377,958 B1 | 4/2002 | Orcutt | |
| 6,453,383 B1 | 9/2002 | Stoddart et al. | |
| 6,530,077 B1 | 3/2003 | Marsh | |
| 6,535,967 B1 | 3/2003 | Milillo et al. | |
| 6,742,020 B1 | 5/2004 | Dimitroff et al. | |
| 6,766,371 B1 | 7/2004 | Hipp | |
| 6,775,829 B1 * | 8/2004 | Kroening | 717/175 |
| 6,907,604 B1 * | 6/2005 | Macnair et al. | 717/175 |
| 6,922,831 B1 * | 7/2005 | Kroening et al. | 717/172 |
| 6,928,644 B1 * | 8/2005 | Kroening et al. | 717/175 |
| 7,062,645 B2 * | 6/2006 | Kroening | 713/1 |
| 7,194,738 B2 * | 3/2007 | Lin et al. | 717/174 |
| 2001/0005889 A1 | 6/2001 | Albrecht | |
| 2001/0047482 A1 | 11/2001 | Harris et al. | |
| 2001/0056425 A1 | 12/2001 | Richard | |
| 2002/0091805 A1 * | 7/2002 | Phillips et al. | 709/220 |
| 2002/0140743 A1 | 10/2002 | DeLuca et al. | |
| 2004/0148596 A1 * | 7/2004 | Watson et al. | 717/168 |
| 2005/0027831 A1 * | 2/2005 | Anderson et al. | 709/220 |
| 2005/0099999 A1 * | 5/2005 | Phillips et al. | 370/352 |

OTHER PUBLICATIONS www.sureboot.com; SureBoot is Revolutionary; taken from referenced cite Aug. 30, 2004.
www.windowsitlibray.com; Installing and Repairing Window NT Server; taken from referenced cite Aug. 23, 2004.
www.linux.duke.edu; Quick Start, Building PXE Server; taken from referenced cite Aug. 23, 2004.
www.microsoft.com; Creating the Workstation Boot CD; taken from the referenced cite Aug. 23, 2004.
http://sea.symantec.com; On Command Discovery; taken from the referenced cite Aug. 16, 2004.
www.winnetmag.com; What's Automated Deployment Services (ADS)?; taken from the referenced cite May 3, 2004.
www.microsoft.com; imgdeploy/capture; taken from the referenced cite Jul. 15, 2004.
www.microsoft.com; adsimage/edit; taken from the referenced cite Jul. 15, 2004.
www.microsoft.com; imgmount/mount; taken from the referenced cite Jul. 15, 2004.
www.microsoft.com; Automate Your Server Deployment with Automated Deployment Services (ADS); taken from the referenced cite May 3, 2004.
www.microsoft.com; Personalizing an image; taken from the referenced cite Jul. 16, 2004.
http://support.microsoft.com; How to Perform an In-Place Upgrade (Reinstallation) of Windows XP; taken from the referenced cite May 3, 2004.
http://support.microsoft.com; How to Force a Hardware Abstraction Layer During an Upgrade of New Installation of Windows XP; taken from the referenced cite May 3, 2004.
www.microsoft.com; Tools Used in the Migration Process; taken from the referenced cite May 3, 2004.
www.microsoft.com; What Is Sysprep?; taken from the referenced cite May 3, 2004.
www.osr.com; General Guidelines for INF Files; taken from the referenced cite May 20, 2004.
http://msdn.microsoft.com; Using INF Files; taken from the referenced cite Jul. 20, 2004.
www.robvanderwoude.com; REGEDIT; taken from the referenced cite May 20, 2004.
http://support.microsoft.com; Microsoft Support WebCasts-Deploying the Microsoft Window.NET Server Platform; taken from the referenced cite May 3, 2004.
http://bugclub.org; What is PnP?; taken from the referenced cite Jul. 15, 2004.
www.nwc.com; Disk Imaging Gets a Makeover; taken from the referenced cite Jul. 16, 2004.
U.S. Appl. No. 09/532,223, filed Mar. 22, 2000, Jenevein et al.
Non Final Office Action Dated Apr. 20, 2005, received in U.S. Appl. No. 10/406,139.
Final Office Action Dated Aug. 25, 2005, received in U.S. Appl. No. 10/406,139.
Non Final Office Action dated Feb. 3, 2006, received in U.S. Appl. No. 10/406,139.
Non Final Office Action Dated May 1, 2007, received in U.S. Appl. No. 10/406,139.
Final Office Action Dated Sep. 21, 2007, received in U.S. Appl. No. 10/406,139.
Altiris brochures on Client Management Suite, Server Management Suite, 2003.
Altiris Press Release dated Jan. 28, 2003.
Altiris Press Release dated Apr. 30, 1999.
Altiris User Guide for LAbExpert 4.1; Coyright 2000.
"Thread: (Leaf-Devel) Dachstein—CD Available" dated Oct. 14, 2001.
Thekkath et al., "techniques for file system simulation"; Oct. 1992.
"hp open view storage data protector 5.0 product brief"; Jun. 2002.
"3 snapshot concepts and architecture"; 1999.
"5 directly create snashop envirnment"; 1999.
Veracity tutorial manual, version 3.4; Jan. 16, 2003.
HDD duplication in RH7.3; Sep. 2, 2002.
Sistina logical volume manager; 1997-2003.
LVM How To; 2002.
Lif_utils—LIF utilities for linux v1.4; Jan. 11, 2002.
"LIF & LIF translation utilities . . . "; Oct. 9, 1989.
Prodeuct Brief "veritas makes windows usable for data center storage"; Mar. 2001.
Veritas white paper, RAID for enterprise computing; Jan. 28, 2000.
"Veritas volume management products for windows"; Mar. 2002.
Detailed usage guide for ASP; Mar. 22, 2003.
PowerQuest white paper of PowerQuest V2i Protector; 2002.
PowerQuest imaging white paper; 2002.
PowerQuest Drive Image 2002 Product Detail; Various Dates.
PowerQuest Drive Image 3.0 Competitive Matrix; Apr. 6, 1999.
Sellers, "Connectix unveils Virtual PC 4.0"; 12-04-22.
Virtual PC for Windows User Guide; Jul. 2002.
Application Engineering Note: Creating Virtual PCs from Symantec Chost Images; Unknown Date.
Connectix BVirtual PC for Windows FAQ; Unknown Date.
Product Brief "Precise—Wquinn's Storage Central SRM 5.0"; Oct. 2001.
Command—Line reference (from ADSHELP.ZIP file); Unknown Date.
ADSHELP.ZIP file (provided on a floppy disc); Unknow Date.
Microsoft Windows Server 2003 Automated Deployment Services Technical Overview; Mar. 2003.
Microsoft Press Release on Automated Deployment Services Beta; Mar. 18, 2003.
Microsoft Systems Management Server Product Overview; Jan. 29, 2002.
The Roles of Network Management Software; Jan. 1996.
Kotz et al. "A detailed Simulation Model of the HP 97560 Disk Drive"; Jul. 18, 2004.
"MacOS 9.2.x—Upgrading" Mar. 19, 2003.
Citrix MetaFrame XP for Windows; 2002.
Information Protection Centers . . . ; May 11, 2000.
Non-Final Office Action received in U.S. Appl. No. 10/406,139, Feb. 5, 2008.
EP Office Action received in related European Application No. 03746118.3; Jan. 16, 2008.
EP Office Action received in related European Application No. 03746118.3; Aug. 14, 2008.
Final Office Action received in related U.S. Appl. No. 10/406,139; Aug. 19, 2008.
Non-Final Office Action received in related U.S. Appl. No. 11/863,939; Oct. 21, 2008.
Final Office Action received in related U.S. Appl. No. 11/863,939; Apr. 3, 2009.

Non-Final Office Action received in realted U.S. Appl. No. 10/406,139; Nov. 24, 2008.
Final Office Action received in related U.S. Appl. No. 11/863,939; Apr. 3, 2009.

Notice of Allowance received in related U.S. Appl. No. 10/406,139; Mar. 12, 2009.

* cited by examiner

RETARGETING A CAPTURED IMAGE TO NEW HARDWARE WHILE IN A PRE-BOOT ENVIRONMENT

RELATED APPLICATIONS

This application is a continuation-in-part of patent application Ser. No. 10/406,139 filed Apr. 2, 2003, incorporated herein by reference, which in turn claims priority to patent application Ser. No. 60/370,100 filed Apr. 3, 2002, also incorporated herein by reference.

FIELD OF INVENTION

The present application is a child of U.S. patent application Ser. No. 10/406,139, which has corresponding international application serial no. PCT/US03/10197, and a descendent of the underlying provisional application Ser. No. 60/370,100. These are jointly and severally referred to herein as the "parent application(s)". They provide context for the present application.

The present invention is not the same as the invention described in the parent application(s). But their Field of the Invention provides some context for the present application, and is therefore specifically incorporated herein by this reference. Generally speaking, the present invention builds on and expands the parent invention's tools and techniques for modifying captured images, with a particular focus here on modifying the captured images to retarget them to new hardware.

BACKGROUND OF THE INVENTION

The parent application(s) discuss previously known tools and techniques in their Technical Background of the Invention. That discussion provides prior art disclosure and other context for the present application, and it is therefore specifically incorporated herein by this reference. The following background is also provided to help in understanding the present invention.

Computer hardware sometimes fails. It must then be replaced, or else functionality is lost. Computer hardware also becomes outmoded or obsolete, such that replacing it becomes desirable even though it still functions as originally intended. For instance, it may be desirable to replace hardware to increase storage capacity or processing speed, or to conform with new industry standards.

But replacing hardware may cause problems. If the replacement hardware has different system characteristics than the previous hardware, it may not function properly unless corresponding software and data changes are also made. For example, it may be necessary to provide a new driver, to change or add Windows registry entries, and/or to modify partition table or other file system information. If the old hardware held the computer's operating system or other software or data needed to run the computer in a way that meets the user's goals, then that software or data may need to be restored from a backup made by a user and/or software may need to be re-installed. Such restoration or reinstallation may in turn overwrite more recent data which has not been backed up. That is, the goal of making the new hardware work may be in tension with the goal of restoring content from a backup copy of the system's data.

As an example, consider the following scenario. Over time, a user modifies the content of a hard disk by adding applications, creating spreadsheets and other documents, specifying personal preferences, and downloading data over a network. The modified disk content is backed up into an image. Additional changes to the content are made, as the user continues using the computer. Then the user decides to replace the hard disk. Perhaps the disk failed, or perhaps it works fine but the user wants a disk with different properties, such as increased storage capacity or faster processing. Regardless, the replacement disk has different system characteristics than the previous disk. For instance, the replacement might have a disk controller that uses a different protocol (e.g., SCSI versus IDE) or a different physical geometry (e.g., a different number of heads or cylinders).

In this situation, the new disk may stop working and/or data may be corrupted or lost, if one restores system data to the new disk from a backup image that was made when the old disk was installed, because the restored system data matches the old disk's characteristics rather than the new disk's. Accordingly, in such situations people have been known to restore data in a file-by-file manner, and to re-install individual applications from the original distribution CDs or floppy disks, instead of restoring applications and data more comprehensively from a back-up image. Such a file-by-file restoration and piecewise reinstallation process can be more time-consuming, and more labor-intensive, than restoring data and software from a back-up image. Moreover, the increased time and effort may be multiplied by hundreds or thousands in enterprises when that many computers are involved.

SUMMARY OF THE INVENTION

This summary is partial and is for convenience only; the invention is defined by the claims as granted and properly interpreted. The present invention builds on the invention that is paraphrased in the parental Brief Summary of the Invention, but is not co-extensive with that invention. However, the parent application(s)' summary of their invention does provide context for the present invention, and is for that reason specifically incorporated herein by this reference, with the understanding that it does not necessarily limit the present invention, although it may support embodiments of interest.

One method of the invention retargets a captured image to new hardware, using the computer-assisted steps of obtaining target computer information identifying new hardware for a target computer, and modifying a presently undeployed image to match new hardware identified in the target computer information, wherein the image was previously captured from a source computer on which the new hardware was not installed.

One method of the invention for computer resource management includes the steps of bringing an ample image of storage of an imaged computer into a management environment at a computer, and modifying the ample image by performing at least one of the following steps on the ample image in the management environment: changing software by installing a hardware driver, changing software by updating a hardware driver, changing software by installing system software other than a hardware driver, changing software by updating system software other than a hardware driver.

In addition to these and other retargeting methods, the invention provides images produced by retargeting methods, media configured with information to facilitate computer execution of retargeting methods, and computer systems configured to retarget captured images to new hardware. Other aspects of the present invention will become more fully apparent through the following description.

BRIEF DESCRIPTION OF THE DRAWINGS

To illustrate the manner in which the advantages and features of the invention are obtained, a more particular description of the invention will be given with reference to the attached drawings. The drawings of the parent application(s) are incorporated herein by reference, and items which first appeared in parental drawings are shown here with the same reference numbers. Some items are discussed in the parental application(s) but appear in drawings for the first time in this present document. Other items both appear in drawings for the first time in the present document and are discussed for the first time in the present document. For convenience, drawings from the parent application(s) are referred to as "parent" drawings while drawings that first appear in the present document are referred to as "present" drawings. Regardless, the drawings only illustrate selected aspects of the invention and thus do not fully determine the invention's scope.

DETAILED DESCRIPTION

Figure 1:
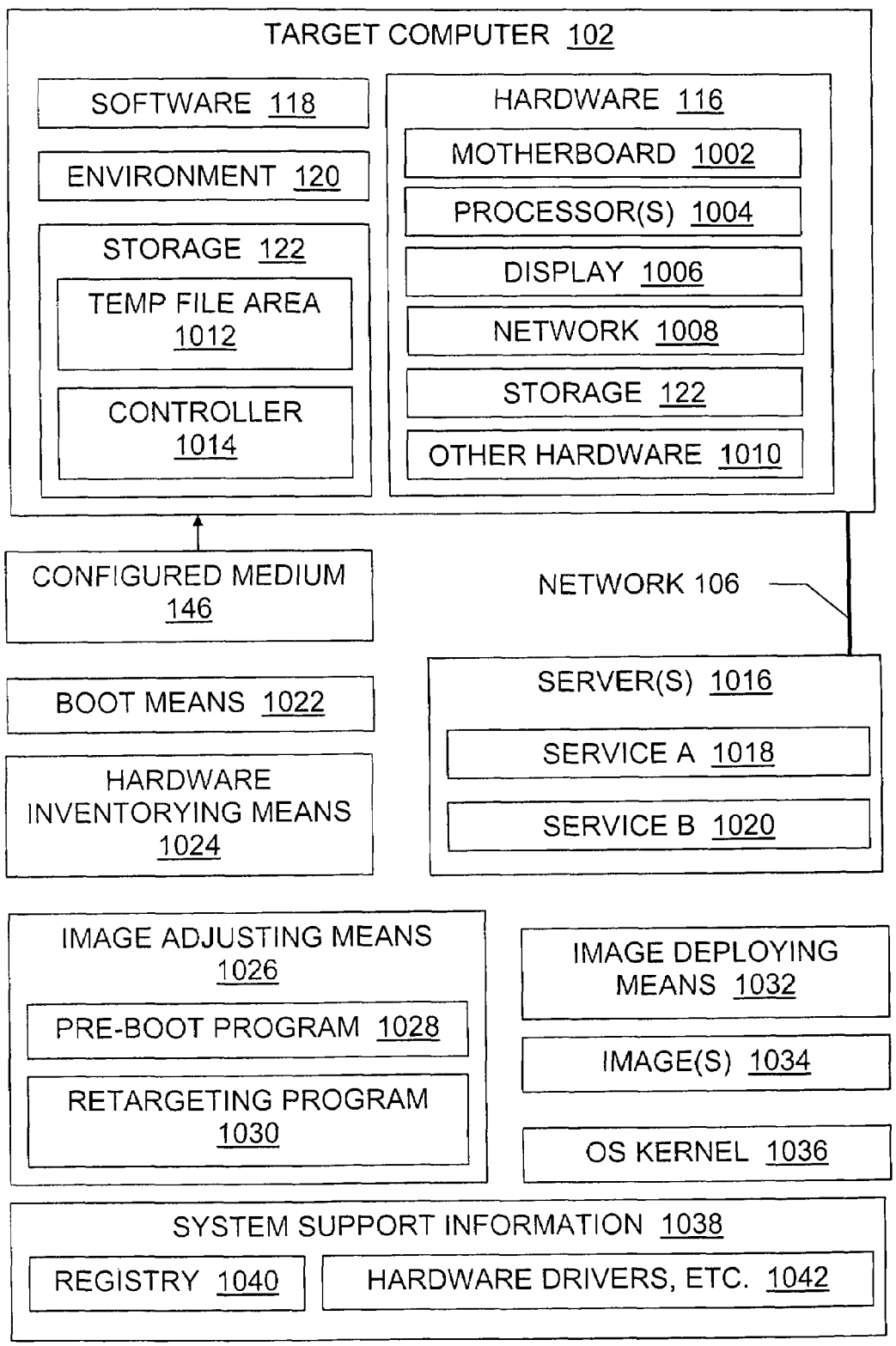
FIG. 1 of the present drawings is a diagram illustrating generally some architectures of the present invention for retargeting captured images to new hardware.

As noted, the parent application(s) are incorporated herein. Additional information is given here, by reference to exemplary embodiments such as those illustrated in the drawings (incorporated and/or first introduced here), and specific language will be used herein to describe the same. But alterations and further modifications of the inventive features illustrated herein, and additional applications of the principles of the inventions as illustrated herein, which would occur to one skilled in the relevant art(s) and having possession of this disclosure, should be considered within the scope of the invention.

In describing the invention, the meaning of important terms is clarified, so the claims must be read with careful attention to these clarifications. Specific examples are given to illustrate aspects of the invention, but those of skill in the relevant art(s) will understand that other examples may also fall within the meaning of the terms used, and within the scope of one or more claims. Words used herein do not necessarily have the same meaning they have in everyday usage or elsewhere. Terms may be defined, either explicitly or implicitly, here in the Detailed Description and/or elsewhere in the application file. Definitions and other pieces of information brought in by incorporation apply herein to the extent they are not overridden or otherwise inconsistent with the present document.

As used herein, for example, an "application program" is a program which receives operating directions mainly from a person; by contrast, system software programs, such as operating systems and their file systems, receive operating directions mainly or exclusively from other programs. Examples of application programs include, without limitation, word processors, spreadsheets, relational database managers, web browsers, and games. Hardware diagnostics are not application programs for purposes of the present document, even though they interact with human users, because they are not routinely used by typical users.

"Booting" a computer means causing the computer to at least begin running low-level software, such as a system diagnostic, a pre-boot program, or an operating system. A booted environment is one in which booting ends by passing control to users through a command interface, or to application programs through a script or the like.

In this document, "deploying" an image on a given computer means running an operating system obtained from inside the image. Merely copying an image into a computer's local storage does not deploy the image, although the image must be on the computer before it can be deployed. If an image is in a computer's storage but the computer is running some other system software, e.g., a pre-boot program, instead of running the image's operating system, then the image is not presently deployed on the computer. One way to deploy an image onto a computer is to copy the image onto the computer and to then boot into the image, which passes control of the computer to the image's operating system.

An "enterprise administration server architecture" provides a database documenting a repository of images, a command console, and client-server software permitting remote deployment of images selected from the repository using the database, the images deployed onto the clients in response to commands received at the command console on the server. Examples include ON Technology iCommand software commercially available through Symantec Corporation; Symantec Ghost software; Mobile Security Manager software from Mobile Automation, Inc., and Deployment Solution software from Altiris, Inc. (marks of their respective owners).

An "image" is a blockwise image of computer storage, not a file-by-file backup of computer storage. Sector-by-sector images and cluster-by-cluster images are examples of blockwise images; they are not file-by-file backups. Image files in *.v2i format produced by commercially available V2I Protector software from the PowerQuest Division of Symantec Corporation are blockwise images. Symantec Corporation's Ghost software produces both file-by-file backups and sector-by-sector images, in response to different file systems, for instance. (V2I PROTECTOR and GHOST are marks of Symantec Corporation.) The "ample images" discussed in the parent application(s) are also images as that term is used in this document.

"Information" in an image may be processor instructions, data, or both. "Software" includes at least processor instructions, and may also include data.

Hardware is "installed" on a computer when a specific device of the type of hardware in question is connected to the computer and is also operable.

A "pre-boot environment" is an environment on a computer during execution of a pre-boot program. "Pre-boot programs" permit only limited operation of the computer, and are used to perform operations such as diagnostics or boot image downloads. Pre-boot programs provide only limited device support, e.g., by providing device drivers only for the display, network, and local storage devices. Full operation of the computer requires more functionality than the pre-boot program supplies; the increased functionality can be provided by fully booting an image of a complete operating system, for instance. Examples of pre-boot programs include memory-resident DOS software; memory-resident LINUX software; Microsoft Windows Preinstallation Environment software, or Intel Pre-Boot Execution Environment software (a.k.a. Extensible Firmware Interface, EFI).

"Registry" information 1040 is not limited here to the context of Microsoft Windows operating systems. Registry information also includes RC files, dot files, and prof files in UNIX operating system environments; config.sys and autoexec.bat files in DOS environments; .ini files in early Windows environments; and registry hive files in more recent Windows environments; SAM, SOFTWARE, SECURITY, and SYSTEM files having registry impact, as well as other system files and system configuration information. (WINDOWS is a mark of Microsoft Corporation; UNIX is a mark of Novell, Inc.).

A "storage device" is a device that provides computer-readable non-volatile storage. Thus, "storage" refers to non-volatile storage. Examples include, without limitation, individual disks, RAID storage, and flash memory.

Methods

The figures illustrate embodiments of the present invention. The invention may be embodied in methods, in storage media configured to perform methods, in images produced by methods, and in systems, for example. Although we focus discussion on methods at this point, it will be understood that much of what is said in the text and shown in the drawings about method embodiments also helps explain configured medium, image, and system embodiments, and vice versa.

Although steps are shown in a particular order in the figures, that is done in part for ease of illustration. Those of skill will appreciate that steps may also be performed in reversed order, or concurrently, when the outcome of a given step is not needed before the commencement of another step. Steps may also be named differently, grouped differently, repeated, separated by intervening actions, and/or omitted, except as specifically required by the claims and operability of the invention.

Parent FIGS. 3-7 help illustrate methods that may modify ample images. Various image modifications are discussed in the parent application(s), but in the present document we focus on modifications that retarget images to new hardware. Such retargeting methods are illustrated, for example, in the flowcharts in FIGS. 9-11 of the present document.

Figure 9:
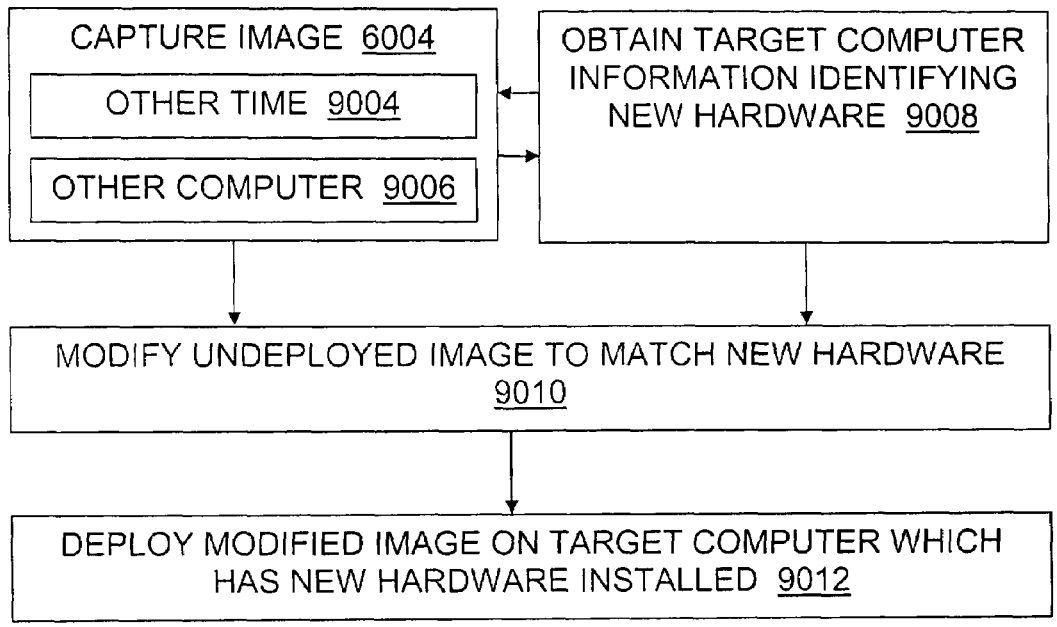
FIG. 9 presents a flowchart illustrating some retargeting methods of the present invention, which may also be embodied in configured media, systems, and retargeted images.

As illustrated in present FIG. 9, the invention provides methods for retargeting a captured image to new hardware. The method includes computer-assisted steps. An obtaining step 9008 obtains target computer 102 information identifying new hardware 116 for a target computer. As used herein, "new" means "different" rather than necessarily meaning "previously unused". Hardware may be new to a given computer, compared to that computer's immediately prior state, even though the hardware has been used before.

As noted in present FIG. 1 and/or otherwise described herein, such obtained information may identify, for example, any one or more of the following as new: a motherboard 1002, one or more processor(s) 1004 and/or the number of processors, a display controller or driver 1006, a network interface controller 1008, a Hardware Abstraction Layer (HAL) setting 1010, a power management setting or controller 1010, a new disk 122 or disk controller 122 or other storage controller 122. Changes in disk or other local storage 122 may include, for instance, changes such as between IDE and SCSI, RAID and fibre channel, and/or geometry changes such as a change in the number of heads and cylinders in a disk.

Returning to present FIG. 9, an image capturing step 6004 captures an image, which will subsequently be modified 9010. In some embodiments, the source computer (from which the image is captured) and the target computer 102 (on which the image will make the new hardware functional and accessible) are the same computer configured differently at different times 9004. In this case, the method captures 6004 the image from that one computer in its configuration as source computer when the new hardware has not yet been installed on it. In other embodiments, the source computer and the target computer are different 9006 computers. The image is captured 6004 from the source computer at a given point in time when the new hardware is installed on the target computer 102 and is not installed on the source computer. In either case, the captured image does not reflect and support the new hardware, so retargeting the image will help users and administrators by tailoring the image to the new hardware.

A modifying step 9010 modifies a presently undeployed image to match new hardware identified in the target computer information. As noted, the image was previously captured from a source computer on which the new hardware was not installed. Ways to perform the modification 9010 are discussed at various points in the parent application(s) and the present document.

Figure 5:
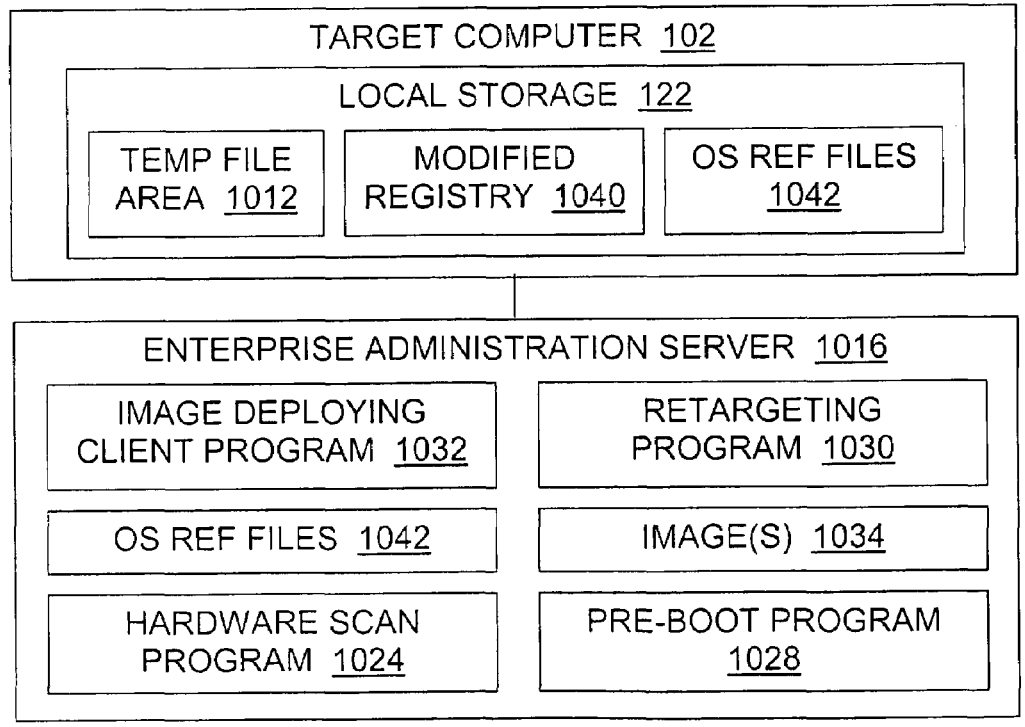
FIG. 5 presents a diagram illustrating an enterprise administration server on-line retargeting architecture of the present invention.

For instance, parent FIG. 5 and the accompanying text disclose installing and/or updating hardware drivers and/or other software in an image. Image modification 9010 also may involve extracting 10008 the registry information from an image, altering it to reflect the new hardware, and then writing 10010 the updated registry entries back into the image. A driver that supports mounting an image for read-only access is provided by the PowerQuest/Symantec V2i Protector product. That driver may be modified or expanded, or other codes may be used, to allow changes in the image and in particular to allow changes that retarget the image to new hardware as described and claimed herein. In some embodiments, the modifying step 9010 includes at least one of: installing 508 a hardware driver 1042 in the image, updating 510 a hardware driver in the image, removing 512 a hardware driver from the image, modifying 10010 an operating system registry in the image. Image modification could be performed on a server computer 102, as shown for instance in present FIG. 7, or on a client computer 102, as shown for instance in present FIG. 8, or on a stand-alone computer, as shown for instance in present FIG. 2.

Figure 6:
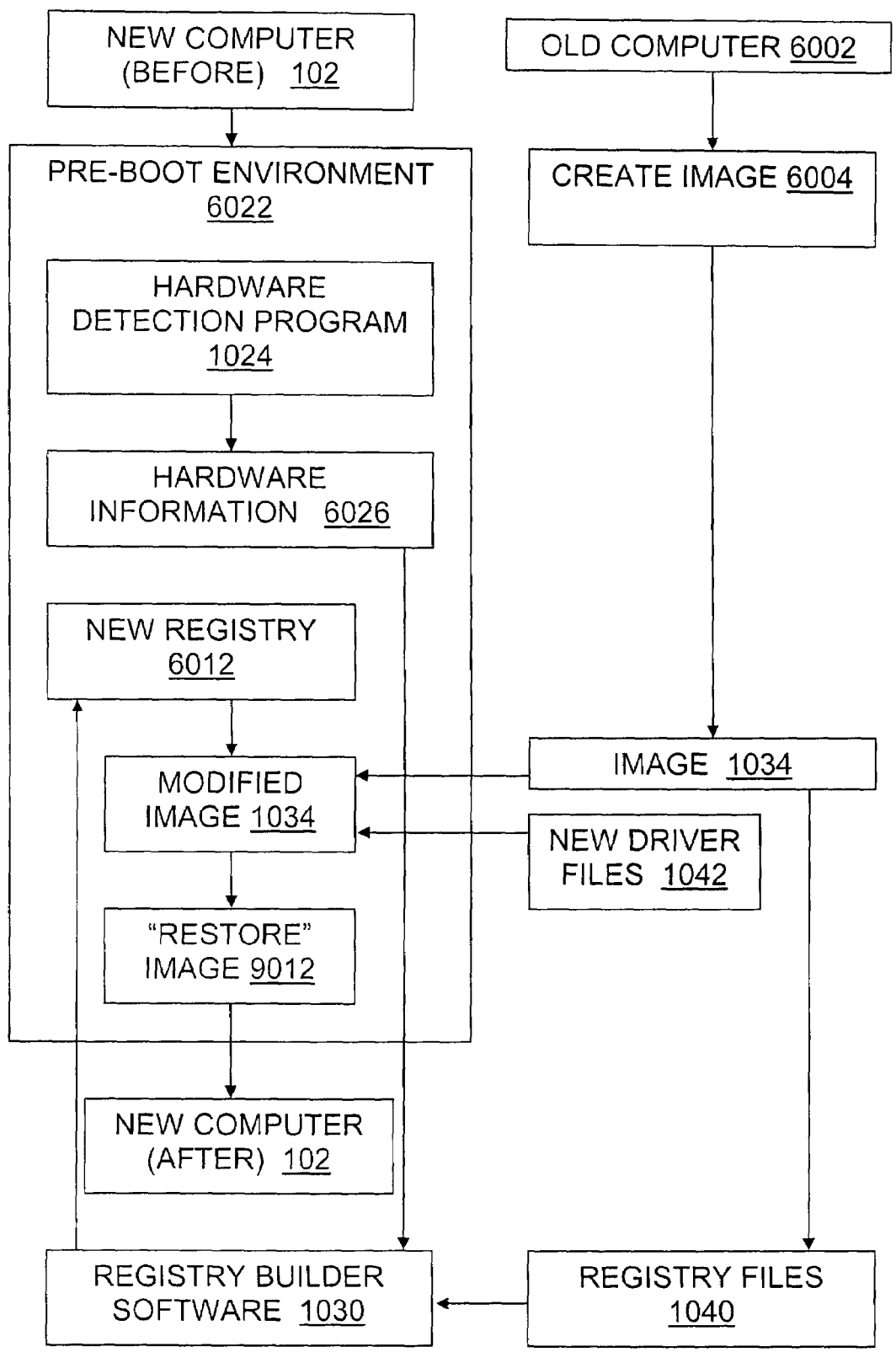
FIG. 6 presents a data flow diagram illustrating data flow and system components in selected methods and systems of the present invention.
Figure 7:
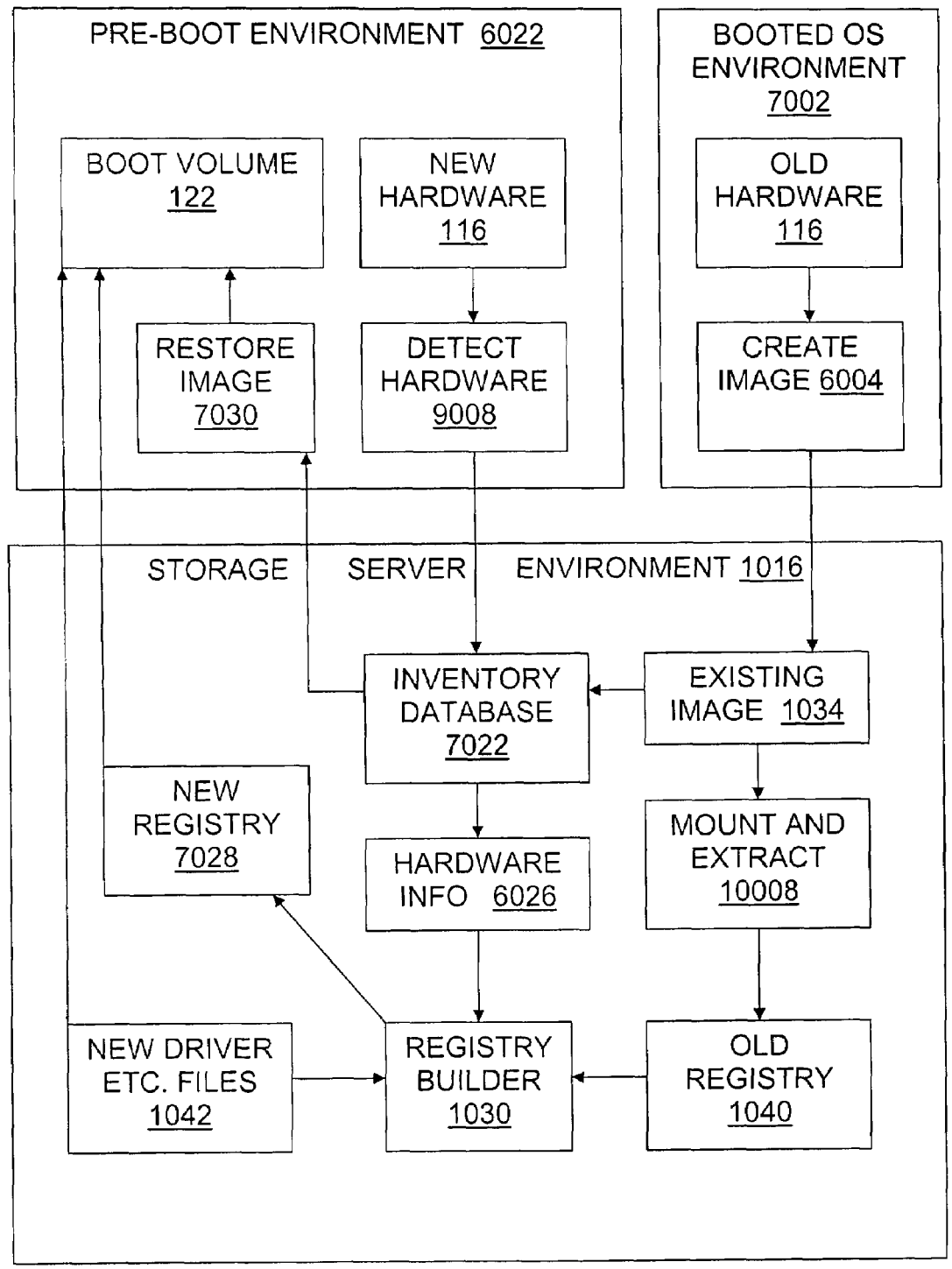
FIG. 7 presents a data flow diagram illustrating data flow and system components in some server-centric methods and systems of the present invention.
Figure 8:
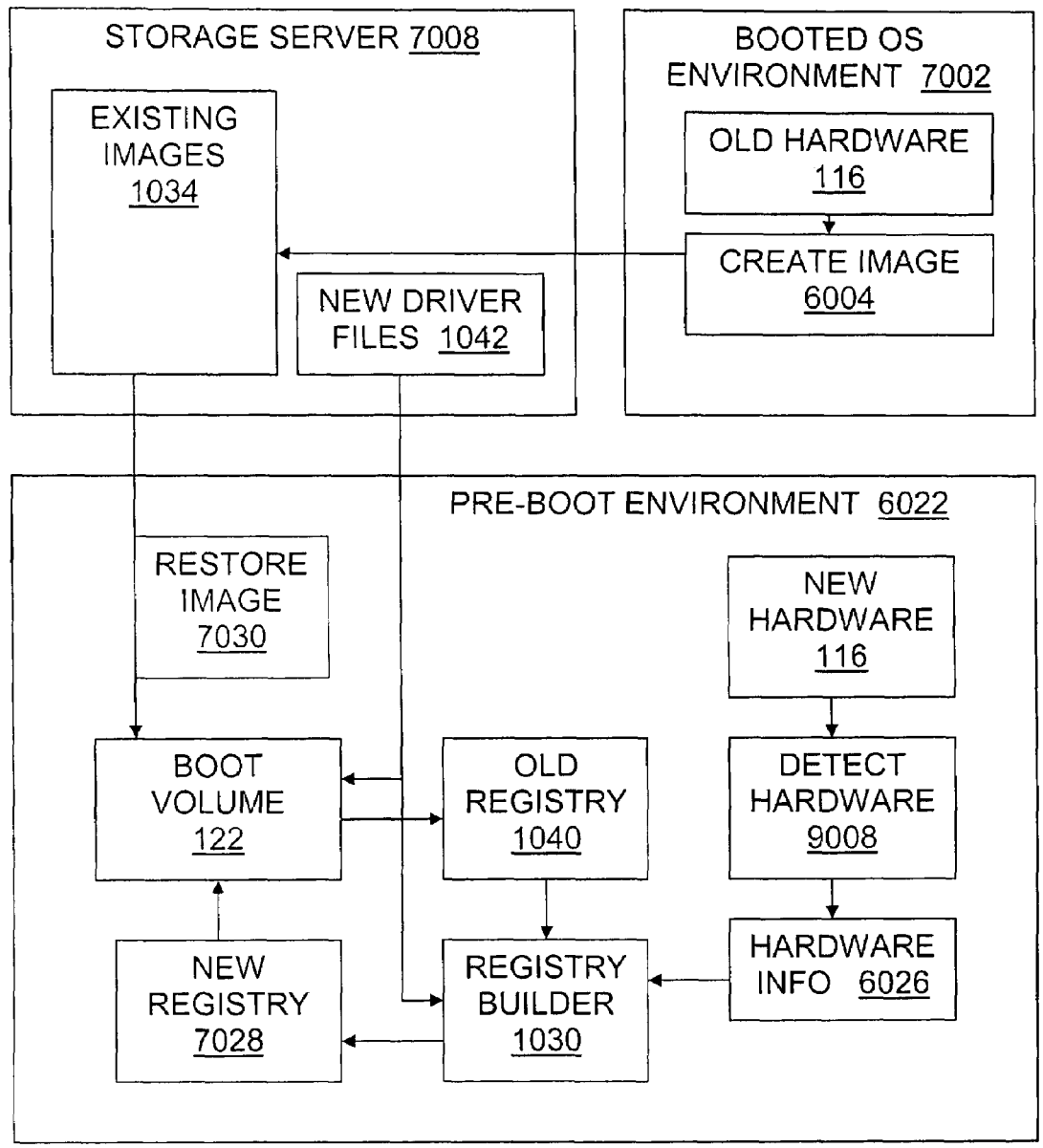
FIG. 8 presents a data flow diagram illustrating data flow and system components in some client-centric methods and systems of the present invention.

As noted in present FIG. 8 and suggested in present FIG. 6, the modifying step 9010 may be performed on the target computer in a pre-boot environment 6022. Pre-boot programs 1028 (present FIG. 1) and pre-boot environments 6022 are defined above, and examples are given. As noted in present FIG. 7, modification 9010 may also be performed on a computer 6002 which is not the target computer. In some embodiments the target is a server, namely, the invention is retargeting a server image for use on a server that has new hardware.

A deploying step 9012 deploys the modified image on the target computer 102 after the new hardware is installed on the target computer. This may be accomplished using familiar image distribution tools (if needed) and familiar writing tools, such as the Symantec Ghost product, Altiris products, or a Symantec/PowerQuest imaging product such as the Drive Image product or one of the V2i products (GHOST, DRIVE IMAGE, and V2I are marks of Symantec).

Figure 10:
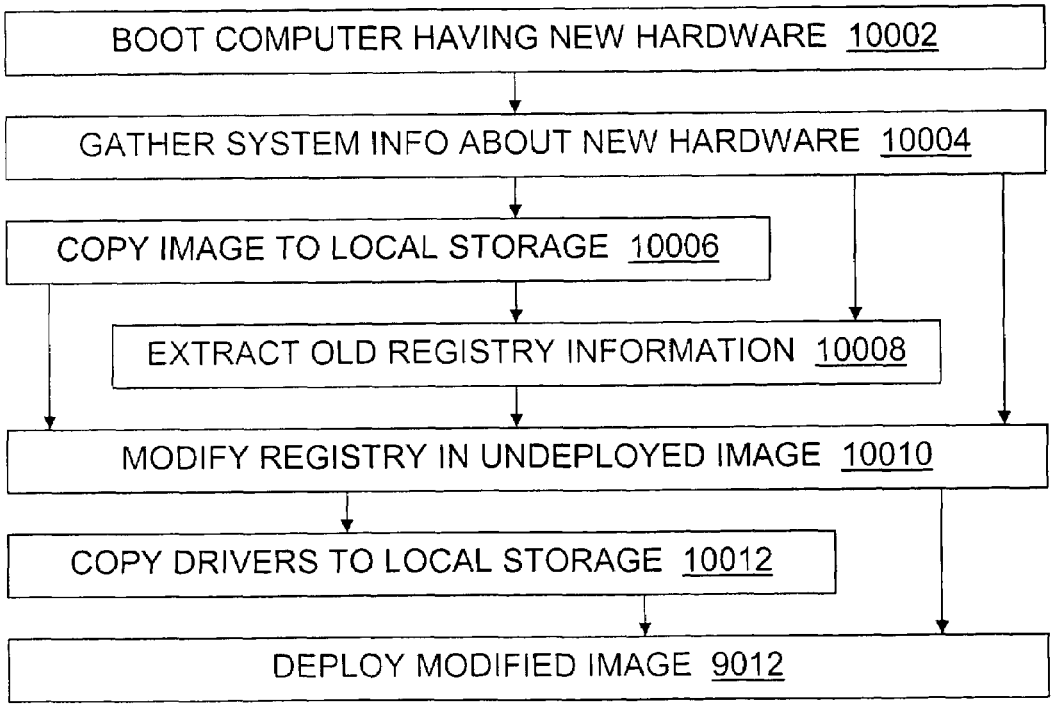
FIG. 10 presents another flowchart illustrating retargeting methods of the present invention, which may also be embodied in configured media, systems, and retargeted images.

FIG. 10 illustrates retargeting methods which begin by booting 10002 a computer that has new hardware, that is, booting into a booted operating system environment 7002 a computer which has hardware that includes certain new hardware of a type which is not identified in the image presently deployed on the computer. An embodiment may boot manually from a removable medium inserted in the computer. It may boot automatically with boot code loaded into the computer over a network connection. It may boot from an attached local storage device, e.g., using a pre-boot operating system from a partition other than the one that will be normally booted. It may boot from a partition that would normally be booted but has been modified to boot into the pre-boot operating system.

Booting in general is well-known. But it will be appreciated that some inconsistencies between a computer's hardware and the image deployed on the computer will hinder or prevent booting from that image. For instance, changed disk geometry may prevent booting by making the boot image inaccessible via the normal boot ROM procedure. In some cases, therefore, booting 10002 includes booting an image subset or an alternate image which is not so inconsistent with new hardware that it prevents booting. Booting may be accomplished, for instance, by booting manually from a bootable CD or floppy, or by a PXE boot. Although not shown expressly in every drawing and not recited in every claim, it will be understood that some form of booting capability will generally be part of the context in which a given embodiment operates.

A gathering step 10004 gathers system information about the new hardware type. Implementing hardware inventory means 1024 may gather hardware information 6026 on-the-fly or by retrieving previously gathered system information from a database 7022. In some Microsoft Windows environments, plug-and-play functionality may be used through an Application Program Interface or otherwise to detect new hardware. Other familiar hardware detection code may also be used, or new code may be written.

A modifying step 10010 modifies a registry 6008 in the presently undeployed image 600, thereby creating a new registry 7028, in order to match system information of the new hardware type. Such registry modification effectively modifies the image, since the registry is part of the image being deployed. To facilitate registry modification, some embodiments extract 10008 old registry information from the image, and the modifying step produces a registry which includes both extracted old registry information and new hardware type system information. For instance, the modifying step may produce a registry which includes extracted old registry security identification information, such as Microsoft Windows SID values or other license key/security attribute/encryption key information. Some embodiments use restored registry files on new storage.

Some embodiments copy 10006 the image 1034 that is to be modified by retargeting into some local storage 122 of the target computer before modifying 10010 the image's registry on that computer. Then they reboot 9012 into the modified image. In some embodiments, the booting 10002 and gathering 10004 steps are performed on a first computer, the modifying 10010 step is performed on a second computer, and the modified image 1034 is then deployed 9012 on the first computer. Some embodiments copy 10012 new hardware drivers 1042 and/or other hardware-specific code and settings into local storage of the target computer. The image 1034 may be an ample image 104 or another image.

Figure 11:
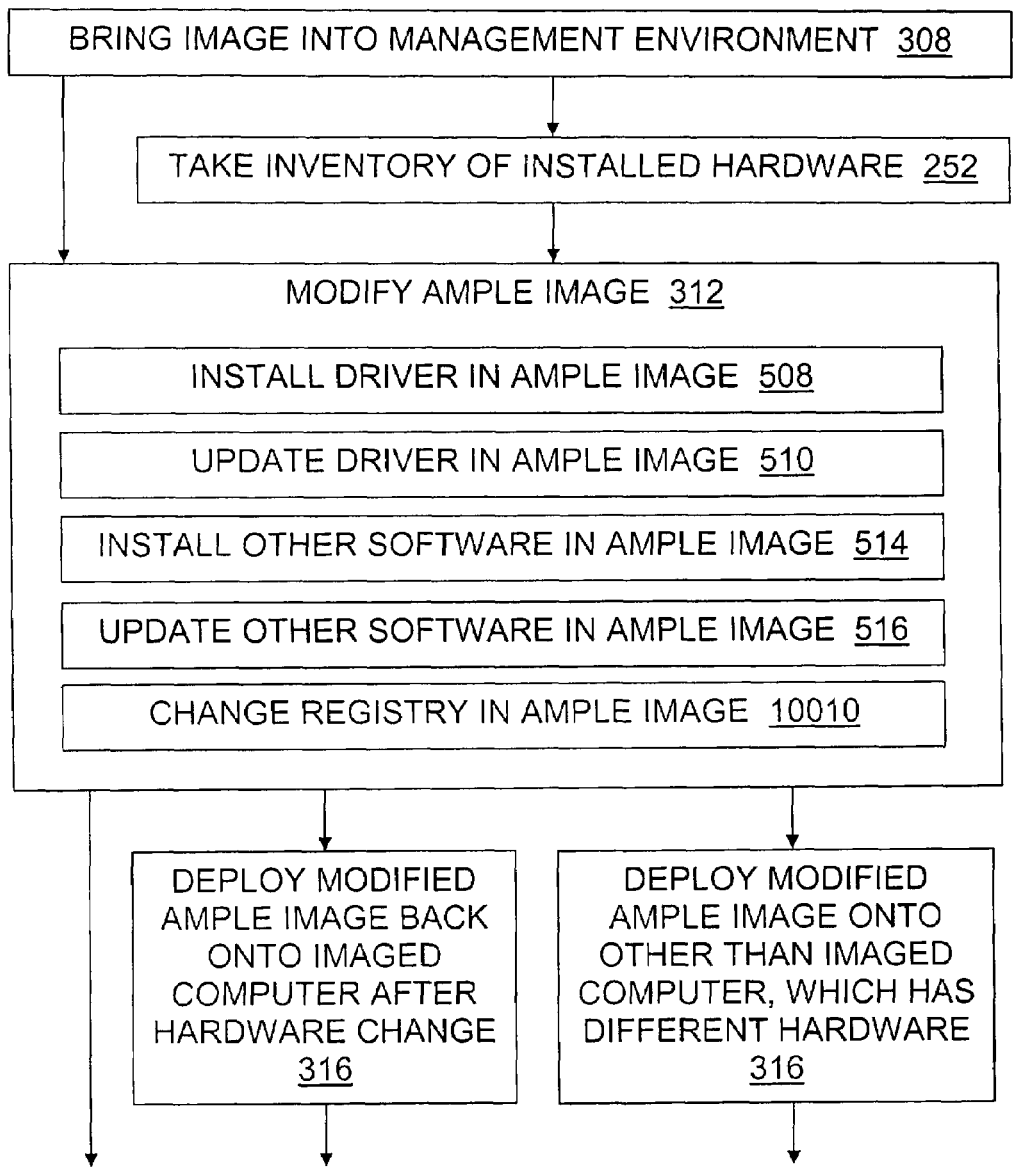
FIG. 11 also presents a flowchart illustrating retargeting methods of the present invention which may likewise be otherwise embodied, with a focus on ample image retargeting as discussed in the parent application(s).

As illustrated in present FIG. 11 and the parent application(s), the present invention also provides methods of computer resource management for retargeting images to new hardware. As noted, the text and figures of the parent applications are incorporated herein by reference, including in particular here the parent application text and figures depicting or discussing the items shown in present FIG. 11.

A bringing step 308 brings into a management environment at a computer an ample image of storage of an imaged computer. This may be done by copying the image over a network 106, for instance, or by loading the image into the management environment from one or more removable storage media 146 such as CDs, DVDs, omega ZIP drives, or the like. As indicated in FIG. 6, a pre-boot environment 6022 may be part of the management environment.

The ample image of the imaged computer may have been taken at a point in time when the imaged computer was a stand-alone machine, or when it was networked. The status of the imaged computer may have changed from stand-alone to networked or vice versa, or it may have remained unchanged. Some methods also include taking 252 an inventory of the installed hardware and software present when the imaged computer was imaged.

A modifying step 312 modifies the ample image by performing at least one of the following steps on the ample image in the management environment: changing software by installing 508 a hardware driver, changing software by updating 510 a hardware driver, changing software by installing 514 system software other than a hardware driver, changing software by updating 516 system software other than a hardware driver, changing 10010 a registry entry in the ample image. The modifying step 312 thus modifies the ample image in a manner that retargets the ample image for new hardware, that is, hardware that is inconsistent with the unmodified ample image.

For example, the modifying step may change the registry in the ample image to match hardware that is different from the imaged computer hardware. The modifying step may be performed at least partially at the imaged computer, and in some cases it is performed at least partially at a computer other than the imaged computer, such as a network server which has the imaged computer as a client.

In some cases, the modified ample image is deployed 316 back onto the imaged computer after a hardware change is made to the imaged computer, so the changed software of the ample image matches the hardware change made. In other cases, the modified ample image is deployed 316 onto a target computer which is not the imaged computer and which has hardware different than the imaged computer had at the imaging point in time, and the changed software matches the different hardware on the target computer.

The steps and other characteristics described herein may be combined in various ways to form embodiments of the invention. In methods of the invention, steps may be omitted, repeated, renamed, supplemented, performed in serial or parallel manner, and/or grouped differently, except as required by the claims and required to provide an operable embodiment. In particular, not every step illustrated in parent FIGS. 3-5 need be performed in a given method according to the present invention.

Images

The present invention also provides fully or partially retargeted images 1034 which are produced by any of the retargeting processes described and claimed herein. For instance, a retargeted image may be produced by first creating 6004, copying 10006, restoring 7030, or otherwise obtaining an image of a computer on which certain hardware is not installed, with the image lacking certain corresponding system information tailored to that hardware, and by then retargeting the image while it is not deployed.

Retargeting is performed by one or more programs 1030 that modify the image to include the corresponding system information tailored to that hardware. This may include modifying 10010 registry entries, installing 508 or updating 510 hardware drivers, or otherwise changing system information to remove inconsistencies that inhibit proper use of the hardware.

The image being retargeted will be a normal client, server, or stand-alone image, not a special-purpose reduced image such as an ADS image. For example, the inventive retargeted image will have functionality not required by ADS, such as by including in the image 1034 routine application programs 118 and a relatively larger or full set of hardware drivers rather than merely network and display drivers.

Systems

As illustrated in present FIGS. 1-8, for example, the present invention also provides systems. The systems of the invention are not limited to those shown in these particular figures. Different embodiments may omit, repeat, regroup, supplement, or rearrange the components illustrated, provided the system overall is operable and conforms to at least one claim. Any computer or set of computers configured with software and/or special-purpose hardware to operate according to a method of the invention, including without limitation methods discussed in connection with any of present FIGS. 9-11, is also a system according to the invention, if only because through such a system one uses a claimed method.

As illustrated in present FIGS. 1-8, for instance, a computer system has a target computer 102 with at least one processor 1004 having some associated memory 1010 which acts as a processor means for running software in the computer. A disk drive, flash memory, tape, and/or other storage 122 serves as a storage means for storing software and other data in a location accessible by the processor means. The storage 122 has a disk controller 1014 or other controller(s) for reading and writing data from/to digital storage locations. For use as needed by retargeting software 1030 and/or other retargeting software 1024, 1026, 1032, and information 1038, the digital storage 122 includes a workspace or temporary file area 1012. An operating system kernel 1036 is runnable on the target computer.

A boot ROM, PXE connection, bootable CD, and/or other boot means 1022 is provided for booting the computer. The boot means may include a network connection and software for obtaining a bootable image, or the computer may be networked but not remote-image-bootable, or the computer may be a stand-alone machine that is not networked but instead boots from a CD or from local storage, for instance.

A hardware inventory means 1024 includes at least software for gathering system information about hardware installed on the computer. The hardware inventory software may be stored on a removable storage medium in the computer, on a network server connected to the computer, and/or on a local attached storage device. Unless it merely accesses a database of previously obtained hardware inventory information, however, it will run at some point on the machine whose hardware is being inventoried. In operation, it identifies attached hardware, e.g. by system calls, BIOS calls, system memory inspection, or other low level queries, e.g., to hardware ports and device controllers.

An image adjustment means 1026 provides software for adjusting an image in response to system information gathered by the hardware inventory means, the adjustment tailored to make operable a particular hardware device that is connected to the computer but not yet operable. For instance, the adjustment means may adjust the image by adding to the image a registry entry or other device-specific identifier identifying the particular hardware device, such as a processor or controller serial number or a network address. If the particular hardware device is of a certain recognized type, the adjustment means 1026 may adjust the image by adding to the image information pertaining to hardware devices of that type, not just to a particular device. Like other means discussed herein, this means may be implemented in software, hardware, or (most commonly perhaps) in a combination of both.

The adjustment means 1026 may include batched regedit code, plug-and-play code, script code for editing Linux system files, or another registry adjustment means for adjusting an operating system registry in the image in response to system information gathered by the hardware inventory means, with the adjustment tailored to make operable a particular hardware device or a particular type of hardware device. The adjustment means may include a driver adjustment means for adjusting at least part of a collection of hardware device drivers in the image in response to system information gathered by the hardware inventory means, with the adjustment tailored to make operable the particular hardware device. The driver adjustment means 1026 does at least one of the following: installs a device driver for the particular hardware device, patches a device driver for the particular hardware device, modifies data used by a driver for the particular hardware device, modifies storage geometry data used by a driver for a nonvolatile storage hardware device, removes a previously installed driver if necessary to make the adjusted image operate on the new hardware.

An image database, or an individual image, is deployed by means 1032 of Symantec, Altiris, Microsoft, and/or other familiar software for deploying a given image on a computer. This supports deploying the adjusted image so that software previously inconsistent with the particular hardware device is made consistent with it via the deployed image, thus permitting operation of the hardware device on the computer after the boot means reboots the computer. In a particular case, this makes it possible to boot the computer from a new boot storage device type, e.g., SCSI rather than IDE. When not in use, the image deployment software may be stored on a removable storage medium in the computer, on a network server connected to the computer, and/or stored on a local attached storage device.

The components shown in the present Figures may be combined in various ways, as recited in the claims. Not every illustrated component need be present in every claimed embodiment. For instance, one system of the present invention includes a new hardware computer (client or server or stand-alone), such as target computer 102. This system includes a computerized source of hardware information about the new hardware computer, such as a hardware inventorying means 1024, e.g., a hardware detection program or a hardware inventory database. That is, the hardware information may have been previously obtained and stored in a database 7022, or it may be obtained on-the-fly (i.e., dynamically or as-needed). This system has a local storage device 122 on the new hardware computer which contains an image 1034 of an old hardware computer. The image is not presently deployed on the new hardware computer.

System support information 1038 for new hardware of the new hardware computer corresponds to at least a portion of the obtained new hardware information. Some examples of system support information not present on the old hardware computer when the image was made are: a hardware driver file, an INF file, RC files, and a registry entry.

This system's retargeting program 1030 is capable of retargeting the image in a pre-boot environment 6022, provided by a pre-boot program 1028, to make the image include at least a portion of the system support information. The retargeting program may run on the new hardware computer, thereby providing a client-centric retargeting architecture such as the one illustrated in present FIG. 8. Alternately, the system may include a server 1016, wherein the retargeting program builds new registry files on the server, the new hardware computer receives the new registry files from the server, and the new registry files are at least a portion of the system support information, thereby providing a server-centric retargeting architecture such as the one illustrated in present FIG. 7.

As illustrated in present FIGS. 6-8, the system may include a pre-boot program 1028 capable of providing a pre-boot environment 6022. The retargeting program 1030 (which may be implemented as a suite of programs, batch files/scripts, parameters/settings, etc.) is capable of retargeting the image in the pre-boot environment to make the image include at least a portion of the system support information before the retargeted image is deployed 9012. This system may further include a plug-and-play setting 1030, wherein code of the retargeting program sets the plug-and-play setting in the pre-boot environment to make the deployed image perform a plug-and-play operation that it would not otherwise perform. That is, in this system, some of the retargeting may occur after the image being deployed has started booting but has not yet finished booting on the computer that has the new hardware.

Some systems include a target computer 102, a pre-boot program 1028 runnable on the target computer, a hardware scan program 1024 runnable on the target computer, an operating system registry 1040, other operating system reference files such as driver files 1042, an operating system kernel 1036 that is runnable on the target computer, an image 1034, an image deploying program 1032 capable of deploying the image onto the target computer, and a retargeting program 1030 capable of modifying system information for the target computer by operations performed on the image in the pre-boot environment 6022 using information provided by the hardware scan program. It will be appreciated that different embodiments may locate some or all of these components differently than a specific example given here. The relative locations of components can make the system in question easier to use, faster, less space-consuming, more secure, or otherwise improve it.

Figure 2:
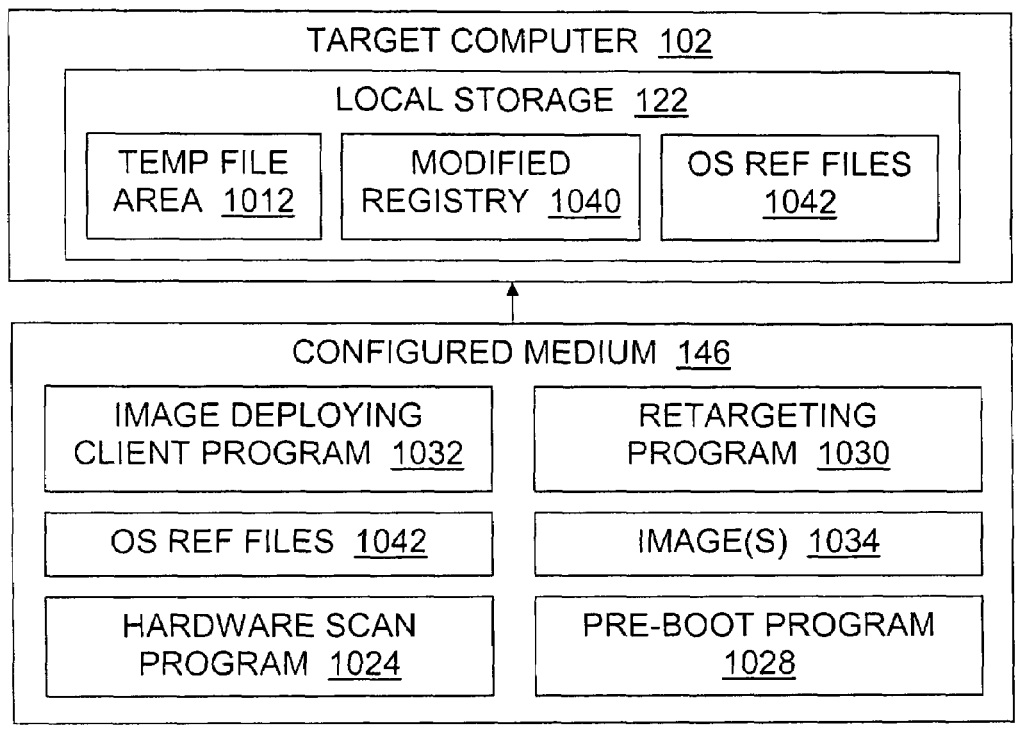
FIG. 2 presents a diagram illustrating an off-line retargeting architecture of the present invention.

For instance, present FIG. 2 illustrates an off-line retargeting architecture in which at least a portion of each of the following resides on at least one CD, DVD, tape, removable disk, or other removable medium readable by the target computer 102: the pre-boot program 1028, the hardware scan program 1024, the image deploying program 1032, the image 1034 that will be modified, the retargeting program 1030 that will modify the image, and at least one operating system reference file, such as a driver file 1042 or other system support information. For instance, modules, device driver, and/or INF files may be taken from a CD, such as a Microsoft Windows XP install CD. One off-line retargeting process does the following: CD boot record loads setupldr.exe; setupldr.exe creates a RAMDisk; setupldr.exe loads WinPE ISO file into memory and boots from RAMDisk; recovery retargeting program runs; needed new driver files are requested; needed new driver files are read from CD; recovery retargeting program finishes. In another embodiment, no RAMDisk is used and/or format other than ISO is used; a pre-boot environment other than WinPE may be used; other variations will also be apparent to those of skill in the art.

Figure 3:
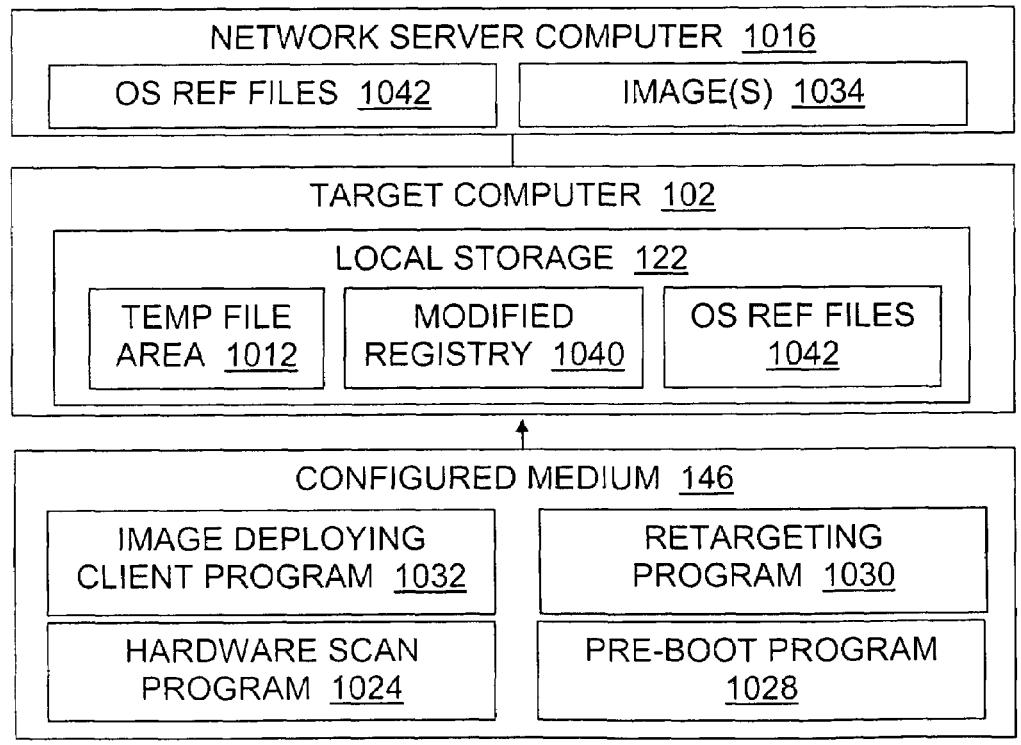
FIG. 3 presents a diagram illustrating a blended off-line/on-line retargeting architecture of the present invention.

By contrast, present FIG. 3 illustrates a blended off-line/on-line retargeting architecture. This system includes a server 1016 that is networked 106 with the target computer 102. At least a portion of each of the following resides on at least one removable medium readable by the target computer: the pre-boot program 1028, the hardware scan program 1024, the image deploying program 1032, and the retargeting program 1030. However, each of the following resides on the server: the image 1034 to be modified, and at least one operating system reference file 1042. One blended off-line/on-line retargeting process does the following: CD boot record loads setupldr.exe; setupldr.exe loads WinPE and ISO file into memory and boots from RAMDisk; connection is made back to a network share; some programs are accessed from the network share; image and reference files are accessed from the network share; recovery retargeting program runs. In another embodiment, no RAMDisk is used and/or format other than ISO is used; a pre-boot environment other than WinPE may be used; other variations will also be apparent to those of skill in the art.

Figure 4:
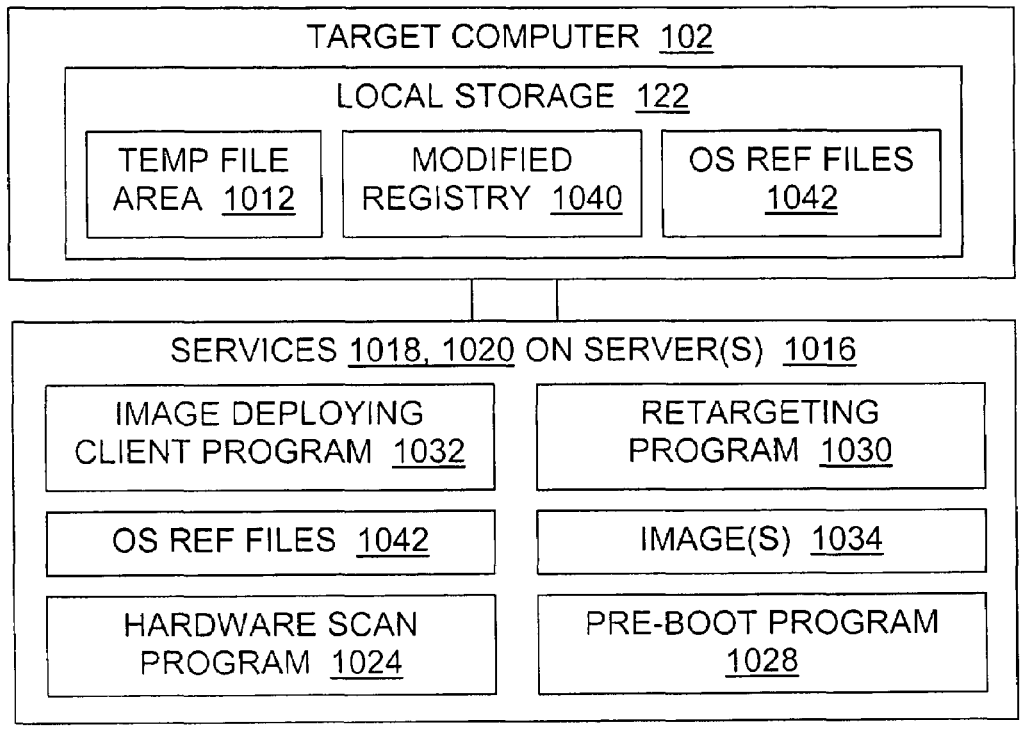
FIG. 4 presents a diagram illustrating a mixed server on-line retargeting architecture of the present invention.

Present FIG. 4 illustrates a mixed server on-line retargeting architecture. A first service 1018 is networked 106 with the target computer and a second service 1020 is also networked with the target computer. At least a portion of the pre-boot program resides with the first service, and at least a portion of each of the following resides with the second service: the hardware scan program, the image deploying program, and the retargeting program. The services 1018, 1020 may run on different servers 1016 or both services may run on the same server 1016. The second service 1020 may run on a server 1016 that conforms with an enterprise administration server architecture. One mixed server on-line retargeting process does the following: force a reboot for PXE boot; TFTP server sends Network Boot Prompt; Network Boot Prompt gets startcom.exe program; startcom.exe loads setupldr.exe; setupldr.exe creates RAMDisk; setupldr.exe loads WinPE (e.g., ISO file) into memory and boots from RAMDisk; recovery retargeting program runs. In another embodiment, no RAMDisk is used and/or format other than ISO is used; a pre-boot environment other than WinPE may be used; other variations will also be apparent to those of skill in the art.

Present FIG. 5 illustrates an enterprise administration server on-line retargeting architecture. An enterprise administration server 1016 is networked with the target computer, and at least a portion of each of the following resides on the enterprise administration server: the pre-boot program, the hardware scan program, the image deploying program, the retargeting program, the image to be retargeted, and at least one operating system reference file. One enterprise administration server on-line retargeting process does the following: push down WinPE ISO package; push down recovery retargeting program; set boot.ini to run setupldr.exe; reboot; setupldr.exe creates RAMDisk; setupldr.exe loads WinPE into memory and ISO file; WinPE boots from RAMDisk; recovery retargeting program runs. In another embodiment, no RAMDisk is used and/or format other than ISO is used; a pre-boot environment other than WinPE may be used; other variations will also be apparent to those of skill in the art.

Configured Media

As illustrated in present FIG. 1, the present invention also provides configured storage media 146. Suitable media include one or more removable storage media such as memory keys, flash memory, CDs, DVDs, omega Zip disks, omega Jazz drives, floppy disks, or other media removable from a computer and capable of carrying computer-readable data which persists even when power to the computer is turned off. Such media in their unformatted states and their generically formatted states are previously known. However, the invention permits the media to be specifically tailored to perform methods such as those illustrated by present FIGS. 9-11, by magnetic, optical, or other bit-storing configurations 146 of data and instructions for performing such methods. No particular file system format or programming language is required by the present invention, and a variety of operating systems (even beyond those mentioned as examples) can likewise be used.

One computer-readable storage medium 146 or set of media 146 is configured to cause a computer system with at least one computer to perform a method as follows. A booting step 10002 boots a computer 102 into a pre-boot environment 6022.

The system runs 10004 a hardware detection program 1024 to gather hardware information about the computer's hardware. NTDetect software or other hardware detection software may be used. Imaging software 1032 writes an image into storage 122 of the computer, but hardware information in the image as written is inconsistent with hardware of the computer such that the image as written and hence not yet modified would not support correct operation of all of the computer's hardware.

In particular, the hardware detection program may gather hardware information about the computer's digital storage 122 hardware, so the subsequent step of modifying the image builds at least one new registry 6012 hardware entry in the image using information about the computer's storage hardware. If the boot code for normal use (other than retargeting) is on the storage hardware, the computer boot process must be able to locate it; inconsistencies between storage 122 system information and actual attached storage 122 devices can create serious problems that prevent booting. When implementing code for detecting hardware and building an entire operating system hardware registry on-the-fly according to the invention, reference may be made to WinPE software, which uses a modified setup to generate a limited generic hardware registry, and/or to ADS software, which detects and builds a limited hardware registry for a deploy version of Microsoft Windows XP software. WinPE and ADS are each available through Microsoft Corporation.

Retargeting software 1030 extracts old registry information of the computer, from the image as it was written during the writing step or from a database. It then modifies the written image in a pre-boot environment by building at least one new registry 6012 hardware entry in an operating system registry in the image using at least some of the gathered hardware information. Registry builder 1030 software may include batch files, scripts, registry editors such as the Microsoft environment regedit editor, text editors in Linux, or other registry modification software directed pursuant to the present invention.

The new registry hardware entry may pertain to one or more of: a new storage controller, a new Hardware Abstraction Layer setting, a new motherboard 1002, a change in the number of processors 1004, a change in power management 1010, a new network interface controller 1008, a new video controller 1006, for example. The modified image may retain all security identification entries in the unmodified image's registry. Finally, software 1032 deploys the modified image 1034 on the computer.

ADDITIONAL INFORMATION AND EXAMPLES

In some embodiments, the invention boots a computer having new storage hardware, by PXE booting, or by manual booting with a CD/floppy. It then runs a hardware detection program and gathers hardware information. It then deploys an existing image to the new hardware storage. It extracts the old registry from the existing image, or uses restored files on the new storage; with these, it builds a new registry hardware portion using the gathered new hardware information. It retains other registry pieces, including all Windows SID-based entries. It has adjusted the storage entries in the registry to match the new storage hardware's shape and size. It may also update the partition table and other system structures to match the disk geometry on the new computer. Any storage configuration that is captured in the operating system configuration information should be updated to match the new hardware configuration. It updates the registry and other system files with the new information, and copies new drivers to the new storage. Finally, it boots and runs the restored and retargeted operating system on the new hardware computer.

In some of the embodiments illustrated by present FIG. 7, the booted OS environment 7002 is a booted Microsoft Windows operating system environment, the pre-boot environment 6022 is a Microsoft WinPE (Windows Pre-Execution) environment, the new driver etc. files 1042 include hardware drivers and INF files, and the storage server 1016 and image operations 6004, 7030 are provided by Symantec PowerQuest V2i Protector software. In other embodiments, one or more of these specific implementation details is changed, e.g., the embodiment includes Linux 7002, Altiris image software 6004, 7030, and so on.

In some of the client-centric embodiments illustrated by present FIG. 8, the booted OS environment 7002 is a booted Microsoft Windows operating system environment, the pre-boot environment 6022 is a WinPE environment, and the storage server 1016 and image operations 6004, 7030 are provided by Symantec PowerQuest V2i Protector software. In other embodiments, one or more of these specific implementation details is changed to include Linux 7002, Altiris image software 6004, 7030, and so on. In general, a client-centric embodiment restores 7030 an old image 1034 to new computer storage 122, gets 10004 the new hardware information 6026, gets 10012 needed driver and install files 1042 and copies them to new computer storage, builds 10010 a new registry and copies it to the new computer storage.

In the figures, the use of the same reference number for files shown in different locations does not necessarily mean that the same individual files are present in both locations, but instead merely means that one or more files of the same type (e.g., image files, driver files, operating system reference files) are present at each location. For instance, in FIGS. 2, 3, 4, and 5, the operating system reference files 1042 inside the local storage 122 are pre-existing files in the image. These installed and running operating system files (or installed and running on old hardware) will generally be a subset of the full set of operating system reference files. A full set of operating system files would be available on installation CDs or other installation media. The operating system reference files 1042 on the configured medium 146 or on one of the servers 1016 include files not yet installed and running, which need to be installed to let the target computer 102 run the new hardware. The fact that files 1042 of the same kind are shown as present both on local storage 122 and on a CD 146 does not mean the same specific files are present on each medium. Indeed, one benefit of some embodiments of the invention is that they make available on local storage certain files 1042 that were previously unavailable there, by determining which files 1042 are needed and copying them to local storage from the CD, with corresponding registry changes also being made as needed.

Variations on the specific examples given herein will be apparent to those of skill in the art, bearing in mind considerations of operability, efficiency, security, ease, speed, and other familiar criteria, in view of the descriptions provided in this document. In evaluating variations, the following general observations may be helpful. Server-centric architectures make it necessary to create two different versions of the retargeting components (one for server execution and one for stand-alone execution); servers need to extract configuration and other registry files from an image; hardware inventory needs to be updated for the hardware platforms with controller vendor and model ID numbers; additional files such as Windows reference files, drivers, and options found on CD distributions may need to be pushed down to the client after image restore; and processing unique to a target takes place on the server. Client-centric architectures can use registry files available on the target client without extracting them from an image; hardware scan can detect and report the current hardware in the format needed, it need not load and resynchronize an inventory database—that can be done later using a normal inventory agent; retargeting and recovery are uncoupled from inventorying; it can use substantially the same steps for all package or other delivery types; server load is reduced by distributing work to each individual client where the necessary retargeting information is available.

The inventive retargeting may be part of a larger maintenance process. For instance, one process runs a recovery operating system; prepares hardware; restores an image to the target system; gets hardware information; checks to see if retargeting is necessary or desired, and skips to the subsequent reboot labeled X below if it is not; if retargeting is to be done, it requests and locates device driver(s), generates registry info, copies new operating system files, performs post configuration steps; reboots (label X); Microsoft Windows boots to safe mode; performs additional post configuration steps; installs and configures application software; reboots (label Y); Microsoft Windows boots to managed mode; takes new image of the retargeted system; updates the inventory database. Post configuration steps may do things such as install anti-virus software, install firewall software, and/or install management agents.

Hardware inventory means 1024 may include a hardware scan program and/or an inventory database 250. Images 1034 may include ample images 104 and/or other images as defined above. System support information 1038 may include registry content 1040, drivers and other system files 1042, and/or structured imaged computer environment data 144. Servers 1016 may be network servers 114 discussed in the parent application(s) and/or servers having other characteristics.

In general, the labels attached to items are not more important than the functionality involved. For instance, in some embodiments it may be more convenient to consider the image adjusting means 1026 as part of the retargeting software 1030, even though present FIG. 1 shows the reverse. Likewise, the hardware inventorying means 1024 might be relabeled as part of the retargeting program 1030, even though present FIG. 1 shows it in a separate box, provided the reorganization is operable and satisfies at least one claim (system, method, or otherwise). Infringement is not avoided by pointing to inconsistency between an accused embodiment and part of the invention description, if the claimed invention is clear to one of skill and otherwise covers the accused embodiment.

In Microsoft Windows operating environments, the intent will often be to preserve the SID security identifiers found in the Windows registry, so that the new system is a replacement for the old system rather than being another operational copy. One could cause a new SID to be generated after the system boots up if one wanted to create another operational copy, but additional licenses might then be needed from Microsoft, depending on the type of license rights already obtained.

One approach the invention provides is to deploy an image onto a computer which has a different hardware configuration than the one imaged, to then detect the new computer's hardware, to build a registry by integrating into the image's registry other registry entries which correspond to the detected hardware, and to then reboot.

Another approach it provides is to take an image on a first computer, move it to a second computer where it will be modified, and then to deploy the modified image onto a third computer which has a different hardware configuration than the first computer. At some point software is run on the third computer to detect the third computer's hardware, then the invention builds a registry by integrating into the image's registry other registry entries which correspond to the detected hardware; this modifies the image while it's still on the second computer. Then the modified image is deployed onto the third computer.

Yet another approach of the invention uses just two computers, namely, the original computer where the image is taken and the new computer where the image is restored, new hardware detected, registry modified, and system rebooted to boot the modified version of the OS. In each approach, many of the processing steps are the same, but where they take place can be chosen to provide different types of administrative control, for example.

The invention operates in the same general area of imaging and maintenance/upgrades as other tools, such as Symantec or Altiris imaging and deployment tools, and ADS, which is an abbreviation for Microsoft Automated Deployment Services. It is believed by the inventor that ADS builds a full registry for a temporary stripped down version of Microsoft's Windows operating system for use as an image deployment operating system platform, for the duration of the deployment process.

Microsoft also provides a program called "Sysprep" which can be used to prepare systems for imaging. As understood by the inventor, Sysprep requires one to have a running computer, run the Sysprep program to prepare for taking an image, shutdown the computer and then take an image. However, although Sysprep includes limited hardware/plug-n-play device detection, Sysprep SID regeneration apparently destroys some application installs, Sysprep apparently does not handle motherboard changes or mass storage device hardware changes, and it apparently doesn't address adding new or updated boot storage device drivers after the image has been created.

Moreover, it is believed by the inventor that using Sysprep requires one to know the changes needed in advance of making the image. But it is sometimes desirable to make the required changes after the image has been taken. In many cases one will not know what changes are needed until long after the image has been created, e.g., what new mass storage device driver needs to be "installed" to allow the image to boot and run on the new hardware. As discussed above, the invention looks at the new target hardware, takes the old captured operating system configuration (e.g., Microsoft Windows registry) in the image file, and modifies the operating system configuration to allow the operating system to boot and run on the new target hardware. This allows a previously captured image file to be used on new hardware without any prior knowledge of the new hardware by performing the configuration changes needed to support the new hardware.

The invention may be helpful when a system configuration will not boot on new hardware, either because the boot storage device driver is not present in the image or because the configuration information is not properly set or complete. The inventor believes that although some Unix/Linux operating system versions contain many device drivers and can auto-configure to support hardware that may not have been installed on the old system, they nevertheless cannot add on-the-fly new device drivers that were not part of the original kernel build. In such a situation, the invention may greatly assist by modifying on-the-fly an image's system configuration by adding to the image some or all of the desired new device drivers.

In implementing the invention, reference to the following Microsoft software may also be helpful: PXE booted NTDETECT module; Deploy OS Registry builder; Deploy OS Builder; PXE booted OS loader; Windows .NET 2003 Virtual Disk driver. Some functionality from these programs may help one better understand, or even help one implement, the present invention.

In addition to the retargeting innovations described here, Symantec's PowerQuest Division has created and applied for patent protection on tools and techniques for coordinating imaging operations with user profile migration to perform migration in place on a computer system. See, e.g., U.S. patent application Ser. No. 09/810,874 filed Mar. 17, 2001. Both that application and the present document address the general problem of preserving desired data and removing undesired data when moving from one computer configuration to another. However, an emphasis in the aforementioned application is on user profiles such as application user settings and user preferences, whereas the present document is more concerned with hardware-enabling system information such as hardware drivers, partition table contents, hardware-specific registry entries, and the like.

CONCLUSION

Methods are provided for retargeting captured images to new hardware. An image taken from a computer having hardware drivers and other system information in one hardware configuration may be retargeted by modifying it in a way that adapts it for use on a computer having different hardware requiring different drivers, even when the second hardware configuration was not known at the time of imaging. Systems and configured storage media for retargeting captured images to new hardware are also provided.

Because hardware, software, and context are often functionally linked in a computer, those of skill will appreciate that statements herein regarding any one of the components 116, 118, 120, 122 of a computer 102 may apply equally, for purposes of the present invention, to some or all of the other components. For instance, software 118 may be installed or removed, and so may hardware 116. Indeed, characterization of a given component as belonging to one of the categories 116, 118, 120, 122 may be more a matter of convenience or perspective than one of widespread consensus. For example, one may view a given component either as BIOS code 118 stored in a computer chip, or as a computer chip 116 that contains some BIOS code.

It is understood that a single entity may sell, offer to sell, or use a system whose individual parts were made by more than one entity. That is, the mere fact that parts of a system were supplied by different vendors does not prevent use of that system (and hence direct infringement) by an individual entity.

The parent application(s)' Detailed Description of Embodiments, drawings, Brief Description of the Drawings, and claims provide context and support for the present invention. They are each specifically incorporated herein by reference, with the understanding that although they support portions of the present claims, the present invention also provides additional tools and techniques.

It is not necessary for every means or aspect identified in a given definition or example to be present or to be utilized in every embodiment of the invention.

Some inventive methods are performed directly by computer hardware and software, and are used by people. They are performed on behalf of and in response to some person's controlling action. Regardless of whether one phrases the invention in terms of steps taken by a person to control a machine that performs a process, or in terms of using a corresponding process performed by a machine, those of skill will understand that it is the particular nature of the process itself that sets it apart as inventive.

Even though particular embodiments and uses of the present invention are expressly illustrated and described individually herein, it will be appreciated that discussion of one type of embodiment and its uses also generally extends to other embodiment types and their uses. For instance, the foregoing description of the invention's methods also helps describe the structures and operation of the invention's systems and configured storage media, and vice versa. It does not follow that limitations from one embodiment are necessarily read into another.

Headings are for convenience only; information on a given topic may be found outside the section whose heading indicates that topic. All claims as filed are part of the specification and thus help describe the invention, and repeated claim language may be inserted outside the claims as needed during prosecution.

It is to be understood that the above-referenced embodiments are illustrative of the application for the principles of the present invention. Numerous modifications and alternative embodiments can be devised without departing from the spirit and scope of the present invention. While the present invention has been shown in the drawings and described above in connection with the exemplary embodiments of the invention, it will be apparent to those of ordinary skill in the art that numerous modifications can be made without departing from the principles and concepts of the invention as set forth in the claims.

As used herein, terms such as "a" and "the" and designations such as "image" and "installing" are inclusive of one or more of the indicated thing or step. In particular, in the claims a reference to a thing generally means at least one such thing is present and a reference to a step means at least one instance of the step is performed.

The scope of the invention is indicated by the appended claims rather than by the foregoing description. All changes which come within the meaning and range of equivalency of the claims are to be embraced within their scope to the full extent permitted by law.

What is claimed is:

1. A computer-implemented method for retargeting a captured image for new hardware, comprising:
   identifying an image captured from a source computer;
   obtaining target computer information, the target computer information identifying new hardware for a target computer that is not presently installed on the source computer; and
   while in a pre-boot environment, modifying the image to match the new hardware identified in the target computer information.

2. The method of claim 1, wherein the source computer and the target computer are the same computer configured differently at different times, and the method further comprises capturing the image from the computer prior to installing the new hardware on the computer.

3. The method of claim 1, wherein the source computer and the target computer are different computers, the new hardware is installed on the target computer and is not installed on the source computer, and the method further comprises capturing the image from the source computer.

4. The method of claim 1, further comprising deploying the modified image on the target computer after the new hardware is installed on the target computer.

5. The method of claim 1, wherein modifying the image comprises at least one of: installing a hardware driver in the image, updating a hardware driver in the image, removing a hardware driver from the image, and modifying an operating system registry in the image.

6. The method of claim 1, wherein the new hardware for the target computer comprises at least one of: a new storage controller, a new Hardware Abstraction Layer setting, a new motherboard, a change in the number of processors, a change in power management, a new network interface controller, a new video controller, and a new display driver.

7. A computer-implemented method for retargeting a computer using an image captured from a computer, comprising:
   booting a computer, the computer comprising a new hardware type not identified in the captured image;
   gathering system information about the new hardware type; and
   while in a pre-boot environment, modifying a registry of the image to match system information of the new hardware type.

8. The method of claim 7, wherein booting the computer comprises at least one of: booting manually from a removable medium attached to the computer, booting automatically using boot code loaded into the computer over a network connection, and booting from an attached local storage device.

9. The method of claim 7, further comprising copying the image into local storage of the computer before modifying the registry of the image, and booting into the modified image.

10. The method of claim 7, wherein the booting and gathering steps are performed on a first computer, the modifying step is performed on a second computer, and the method further comprises deploying the modified image on the first computer.

11. The method of claim 7, further comprising extracting old registry information from the image, and wherein modifying the registry of the image comprises producing a registry that comprises extracted old registry information and new hardware type system information.

12. The method of claim 11, wherein modifying the registry of the image comprises producing a registry that comprises extracted old registry security identification information.

13. The method of claim 7, further comprising copying new hardware drivers into local storage of the computer.

14. A method of computer resource management, comprising:
   identifying an ample image captured from an imaged computer;
   bringing the ample image into a management environment at a computer; and
   while in a pre-boot environment, modifying the ample image by performing at least one of the following steps on the ample image in the management environment: changing software by installing a hardware driver, changing software by updating a hardware driver, changing software by installing system software other than a hardware driver, changing software by updating system software other than a hardware driver.

15. The method of claim 14, further comprising the step of deploying the modified ample image back onto the imaged computer after a hardware change is made to the imaged computer, wherein the changed software matches the hardware change made.

16. The method of claim 14, further comprising the step of deploying the modified ample image onto a target computer which is not the imaged computer and which has hardware different than the imaged computer had at the imaging point in time, and the changed software matches the different hardware on the target computer.

17. The method of claim 14, wherein the modifying step comprises changing the registry in the ample image to match hardware that is different from hardware of the imaged computer.

18. The method of claim 14, wherein the modifying step is performed at least partially at the imaged computer.

19. The method of claim 14, wherein the modifying step is performed at least partially at a computer other than the imaged computer.

20. The method of claim 14, further comprising the step of taking an inventory of installed hardware and software present when the image of the imaged computer was captured.

21. The method of claim 14, wherein the bringing step brings an ample image of the imaged computer that was taken at a point in time when the imaged computer was a stand-alone machine.

22. The method of claim 14, wherein the bringing step brings an ample image of the imaged computer that was taken at a point in time when the imaged computer was connected to a network.

23. A retargeted image produced by a process comprising:
   obtaining an image captured from a computer on which certain hardware is not installed, the image lacking certain corresponding system information tailored to that hardware; and
   retargeting the image, while it is not deployed, by modifying it while in a pre-boot environment to include the corresponding system information tailored to that hardware;
   wherein that system information includes at least one of the following: a hardware driver for that hardware, a registry entry for that hardware.

24. The retargeted image of claim 23, comprising at least two application programs.

25. At least one computer-readable storage medium configured to cause a computer system with at least one computer to perform a method comprising:
  booting a computer into a pre-boot environment;
  running a hardware detection program to gather hardware information about hardware of the computer;
  writing an image captured from a computer into storage of the computer, the image comprising hardware information that is inconsistent with at least some of the gathered hardware information;
  extracting old registry information from the computer;
  modifying the image in a pre-boot environment by building at least one new registry hardware entry in an operating system registry in the image using at least some of the gathered hardware information; and
  deploying the modified image on the computer.

26. The configured storage medium of claim 25, wherein the new registry hardware entry pertains to at least one of: a new storage controller, a new Hardware Abstraction Layer setting, a new motherboard, a change in the number of processors, a change in power management, a new network interface controller, a new video controller or new display driver.

27. The configured storage medium of claim 25, wherein the step of running a hardware detection program gathers hardware information about storage hardware of the computer, and the step of modifying the image builds at least one new registry hardware entry in the image using information about the storage hardware of the computer.

28. The configured storage medium of claim 25, wherein the step of extracting old registry information extracts registry information from the image as it was written during the writing step.

29. The configured storage medium of claim 25, wherein the step of modifying the image retains all security identification entries in the image's registry.

30. A computer system comprising:
  processor means for running software in a computer;
  storage means for storing software and other data in a location accessible by the processor means;
  boot means for booting the computer;
  hardware inventory means for gathering system information about hardware installed on the computer;
  adjustment means for adjusting an image captured from a computer while in a pre-boot environment and in response to system information gathered by the hardware inventory means, the adjustment tailored to make operable a particular hardware device that is connected to the computer but not yet operable;
  image deployment means for deploying the image on the computer, including deploying the adjusted image, whereby software previously inconsistent with the particular hardware device is made consistent with it via the deployed image, thus permitting operation of the hardware device on the computer after the boot means reboots the computer.

31. The system of claim 30, wherein the adjustment means adjusts the image by adding to the image a device-specific identifier identifying the particular hardware device.

32. The system of claim 30, wherein the particular hardware device is of a certain type, and the adjustment means adjusts the image by adding to the image information pertaining to hardware devices of that type.

33. The system of claim 30, wherein the boot means comprises a network connection and software for obtaining a bootable image.

34. The system of claim 30, wherein the adjustment means comprises a registry adjustment means for adjusting an operating system registry in the image in response to system information gathered by the hardware inventory means, the adjustment tailored to make operable the particular hardware device.

35. The system of claim 30, wherein the adjustment means comprises a driver adjustment means for adjusting at least part of a collection of hardware device drivers in the image in response to system information gathered by the hardware inventory means, the adjustment tailored to make operable the particular hardware device.

36. The system of claim 35, wherein the driver adjustment means does at least one of the following: installs a device driver for the particular hardware device, patches a device driver for the particular hardware device, modifies data used by a driver for the particular hardware device, modifies storage geometry data used by a driver for a nonvolatile storage hardware device.

37. The system of claim 30, wherein the hardware inventory means comprises at least one of the following: software stored on a removable storage medium in the computer, software stored on a network server connected to the computer, software stored on a local attached storage device.

38. The system of claim 30, wherein the image deployment means comprises at least one of the following: software stored on a removable storage medium in the computer, software stored on a network server connected to the computer, software stored on a local attached storage device.

39. A system comprising:
  a new hardware computer;
  a computerized source of hardware information about the new hardware computer;
  a local storage device of the new hardware computer which contains an image captured from an old hardware computer, the image not presently deployed on the new hardware computer;
  system support information for new hardware of the new hardware computer, the system support information corresponding to at least a portion of the hardware information about the new hardware; and
  a retargeting program which is capable of retargeting the image in a pre-boot environment to make the image include at least a portion of the system support information.

40. The system of claim 39, wherein the computerized source of hardware information about the new hardware computer comprises at least one of the following: a hardware detection program, a hardware inventory database, a hardware inventory list.

41. The system of claim 39, wherein the system support information comprises at least one of the following: a hardware driver file not present on the old hardware computer when the image was made, an INF file not present on the old hardware computer when the image was made, RC files, a registry entry not present on the old hardware computer when the image was made.

42. The system of claim 39, wherein the retargeting program runs on the new hardware computer, thereby providing a client-centric retargeting architecture.

43. The system of claim 39, further comprising a server, wherein the retargeting program builds new registry files on the server, the new hardware computer receives the new registry files from the server, and the new registry files are at least a portion of the system support information, thereby providing a server-centric retargeting architecture.

44. The system of claim 39, further comprising a pre-boot program capable of providing a pre-boot environment, wherein the retargeting program is capable of retargeting the image in the pre-boot environment to make the image include at least a portion of the system support information before the retargeted image is deployed.

45. The system of claim 39, further comprising a pre-boot program capable of providing a pre-boot environment, and further comprising a plug and play or other hardware detection setting, wherein the retargeting program sets the hardware detection setting in the pre-boot environment to make the deployed image perform a hardware detection operation that it would not otherwise perform.

46. The system of claim 39, wherein the system support information comprises system support for at least one of the following: new motherboard hardware, new storage device hardware, new display hardware.

47. A system comprising:
a target computer;
a pre-boot program runnable on the target computer;
a hardware scan program runnable on the target computer;
an operating system registry, operating system reference files, and an operating system kernel that is runnable on the target computer;
an image captured from a source computer;
an image deploying program capable of deploying the image onto the target computer; and
a retargeting program capable of modifying, in a pre-boot environment, system information for the target computer using information provided by the hardware scan program.

48. The system of claim 47, in an off-line retargeting architecture, wherein at least a portion of each of the following resides on at least one removable medium readable by the target computer:
the pre-boot program,
the hardware scan program,
the image deploying program,
the image,
the retargeting program, and
at least one operating system reference file.

49. The system of claim 47, in a blended off-line/on-line retargeting architecture, the system further comprising a server networked with the target computer, wherein at least a portion of each of the following resides on at least one removable medium readable by the target computer:
the pre-boot program,
the hardware scan program,
the image deploying program, and
the retargeting program;
and wherein each of the following resides on the server:
the image, and
at least one operating system reference file.

50. The system of claim 47, in a mixed server on-line retargeting architecture, the system further comprising a first service networked with the target computer and a second service networked with the target computer, wherein at least a portion of the pre-boot program resides with the first service, and at least a portion of each of the following resides with the second service:
the hardware scan program,
the image deploying program, and
the retargeting program.

51. The system of claim 50, wherein the second service runs on a server that conforms with an enterprise administration server architecture.

52. The system of claim 47, in an enterprise administration server on-line retargeting architecture, the system further comprising an enterprise administration server which is networked with the target computer, wherein at least a portion of each of the following resides on the enterprise administration server:
the pre-boot program,
the hardware scan program,
the image deploying program,
the retargeting program,
the image, and
at least one operating system reference file.

* * * * *